US012491440B2

(12) United States Patent
Ojima et al.

(10) Patent No.: US 12,491,440 B2
(45) Date of Patent: Dec. 9, 2025

(54) GAME SYSTEM, MEDIUM, AND METHOD FOR DETERMINING BALL SPEED AND CLIMB ANGLE

(71) Applicant: Konami Digital Entertainment Co., Ltd., Tokyo (JP)

(72) Inventors: Masatoshi Ojima, Tokyo (JP); Yuji Fujishiro, Tokyo (JP); Shota Kobayashi, Tokyo (JP); Yugo Kishino, Tokyo (JP); Junichi Taya, Tokyo (JP); Kenta Ogawa, Tokyo (JP); Hideto Nishiyama, Tokyo (JP); Shuto Aoyagi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 257 days.

(21) Appl. No.: 18/491,074

(22) Filed: Oct. 20, 2023

(65) Prior Publication Data

US 2024/0042321 A1 Feb. 8, 2024

Related U.S. Application Data

(63) Continuation of application No. PCT/JP2022/018155, filed on Apr. 19, 2022.

(30) Foreign Application Priority Data

Jun. 18, 2021 (JP) ................................. 2021-101542

(51) Int. Cl.
*A63F 13/573* (2014.01)
*A63F 13/44* (2014.01)
(Continued)

(52) U.S. Cl.
CPC ............ *A63F 13/573* (2014.09); *A63F 13/44* (2014.09); *A63F 13/75* (2014.09); *A63F 13/812* (2014.09)

(58) Field of Classification Search
CPC ........ A63F 13/42; A63F 13/44; A63F 13/573; A63F 13/75; A63F 13/812; A63F 2300/64
See application file for complete search history.

(56) References Cited

U.S. PATENT DOCUMENTS 7,270,601 B2 * 9/2007 Takahashi ............. A63F 13/812 463/3
7,887,402 B2 * 2/2011 Suzuki .................... A63F 13/44 273/317.1
(Continued)

FOREIGN PATENT DOCUMENTS

JP 2001-327751 A 11/2001
JP 2007-159801 A 6/2007

OTHER PUBLICATIONS

International Search Report dated Jul. 5, 2022 in Application No. PCT/JP2022/018155.
(Continued)

*Primary Examiner* — William H Mcculloch, Jr.
(74) *Attorney, Agent, or Firm* — Sughrue Mion, PLLC

(57) ABSTRACT

A non-transitory computer readable storage medium according to the present invention stores a computer program causing a control unit of a game device, which provides a soccer game that includes a normal shot that follows a rule that the movement speed and climb angle of a ball increase according to the duration of an operation of a left operation button of a controller, to function as the following device. That is, the computer program causes the control unit to function as a device that, when an R2 button of the controller has been pressed, decides, according to the duration of the operation of the left operation button, the movement speed
(Continued)

and climb angle of the ball in accordance with a rule which differs from that of the normal shot, and controlling display so that the ball moves at the decided movement speed and the like, as a power shot of a kind similar to the normal shot.

11 Claims, 11 Drawing Sheets

(51) Int. Cl.
*A63F 13/75* (2014.01)
*A63F 13/812* (2014.01)

(56) References Cited

U.S. PATENT DOCUMENTS

| | | | | |
|---|---|---|---|---|
| 8,016,673 | B2 * | 9/2011 | Takatsuka | A63F 13/52<br>463/32 |
| 8,033,914 | B2 * | 10/2011 | Yoshikawa | A63F 13/26<br>463/31 |
| 8,226,478 | B2 * | 7/2012 | Komatsumoto | A63F 13/54<br>463/31 |
| 8,319,786 | B2 * | 11/2012 | Endo | G06T 15/80<br>345/426 |
| 9,387,399 | B2 * | 7/2016 | Ojima | A63F 13/42 |
| 9,504,917 | B2 * | 11/2016 | Rabin | A63F 13/211 |
| 9,925,460 | B2 * | 3/2018 | Rabin | G06F 3/0346 |
| 10,409,363 | B1 * | 9/2019 | Kudirka | A63F 13/211 |
| 10,684,677 | B2 * | 6/2020 | Kudirka | A63F 13/812 |
| 11,707,678 | B2 * | 7/2023 | Yamamura | A63F 13/211<br>463/3 |
| 11,745,106 | B2 * | 9/2023 | Lee | A63F 13/573<br>463/4 |
| 11,925,865 | B2 * | 3/2024 | Yamamura | A63F 13/56 |
| 12,023,586 | B2 * | 7/2024 | Yamamura | A63F 13/45 |
| 12,343,632 | B2 * | 7/2025 | Penner | A63F 13/57 |
| 2006/0128468 | A1 * | 6/2006 | Yoshikawa | A63F 13/26<br>463/36 |
| 2007/0270223 | A1 * | 11/2007 | Nonaka | A63F 13/00<br>463/37 |
| 2008/0096622 | A1 * | 4/2008 | Terada | A63F 13/812<br>463/2 |
| 2011/0007079 | A1 * | 1/2011 | Perez | A63F 13/56<br>345/473 |
| 2012/0309479 | A1 * | 12/2012 | Ojima | A63F 13/24<br>463/2 |
| 2024/0042321 | A1 * | 2/2024 | Ojima | A63F 13/75 |
| 2024/0245994 | A1 * | 7/2024 | Nakamura | A63F 13/812 |

OTHER PUBLICATIONS

Japanese Office Action dated Sep. 16, 2021 in Application No. 2021-101542.

Written Opinion of the International Searching Authority dated Jul. 5, 2022 in Application No. PCT/JP2022/018155.

Puatan Japan, "FIFA21 [Shooting Technique Course for scoring a goal] , Tada Ute! Ba Nanika Hairu! How to Tada Ute !!」", Youtube [online] [video], Oct. 17, 2020, https://www.youtube.com/watch?v=D7C8MnvKRRM.

FIFA20 Shooting course for Seriously Super Successful [High Precision & Low Trajectory Shooting Edition], How to Migoto Na Consyu–, Apr. 3, 2020, https://www.youtube.com/watch?v=iJfNYlaLHy4 (1 page).

Notice of Preliminary Rejection dated Apr. 7, 2025 in Korean Patent Appln. No. 10-2023-7033744.

* cited by examiner

GAME SYSTEM, MEDIUM, AND METHOD FOR DETERMINING BALL SPEED AND CLIMB ANGLE

BACKGROUND OF THE INVENTION

Field of the Invention

The present invention relates to a computer program and the like, applied to a computer incorporated in a game system connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command.

Description of the Related Art

There is a game system that is connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command. For example, there has been known a computer program causing a computer of a game system to provide a soccer game including a player as such a character of a user (for example, see Patent Literature 1).

CITATION LIST

Patent Literature

Patent Literature 1
JP2001-327751A

SUMMARY OF THE INVENTION

Technical Problem

In the soccer game of Patent Literature 1, the direction of a shot is set through operation of an analog stick, the angle (height) thereof in a vertical direction is set depending on a length of time for which a shooting button is pressed, and the speed thereof is set depending on strength with which the shooting button is pressed. In such a case, delicacy is required to adjust the strength with which the shooting button is pressed, and a certain level of skill is required to adjust the angle and the speed. As a result, a skill is also required to reproduce a shot with the same angle and the same speed. In contrast, in some similar soccer games, both the angle and the speed are decided at the same time based on the operation time (duration) of a single operation. In such a case, a relation between the angle and the speed of a shot is maintained constant based on a predetermined rule that is preset. Accordingly, the same type of shots with the same angle and speed can be reproduced relatively easily. On the other hand, different types of shots with different angle-speed relations cannot be implemented with only a single operation. As a result, there is a possibility that types of shots are limited.

Accordingly, an object of the present invention is to provide a computer program and the like that can increase types of shots in a soccer game in which both the movement speed and the climb angle of a ball are decided depending on the duration of a single command.

Solution to Problem

The non-transitory computer readable storage medium of the present invention is a non-transitory computer readable storage medium storing a computer program for a computer incorporated in a game system connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command, wherein the computer program causes the computer to function as: a speed decision device configured to, when a specific command associated with a second shot as a shot moving in the predetermined direction similarly to the first shot is given as part of the shoot command, decide the movement speed and the climb angle of the ball for the second shot so that the movement speed and the climb angle of the ball increase depending on the duration of the speed command, according to a second rule as a different rule from the first rule; and a display control device configured to control display of the ball so that the ball moves as the second shot with the movement speed and the climb angle decided according to the second rule.

The game system according to the present invention is a game system comprising a computer connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command, wherein the computer serves as: a speed decision device configured to, when a specific command associated with a second shot as a shot moving in the predetermined direction similarly to the first shot is given as part of the shoot command, decide the movement speed and the climb angle of the ball for the second shot so that the movement speed and the climb angle of the ball increase depending on the duration of the speed command, according to a second rule as a different rule from the first rule; and a display control device configured to control display of the ball so that the ball moves as the second shot with the movement speed and the climb angle decided according to the second rule.

The control method according to the present invention is a control method executed by a computer incorporated in a game system connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command, wherein the control method comprises: a speed decision procedure of, when a specific command associated with a second shot (PS) as a shot moving in the predetermined direction similarly to the first shot is given as part of the shoot command, deciding the movement speed and the climb angle of the ball for the second shot so that the movement speed and the climb angle of the ball increase depending on the duration of the speed command, according to a second rule as a different rule from the first rule; and a display control procedure of controlling display of the ball so that the ball moves as the second shot with the movement speed and the climb angle decided according to the second rule. The game system of the present invention can be implemented by executing the computer program or the control method of the present invention.

DESCRIPTION OF THE EMBODIMENTS

Figure 1:
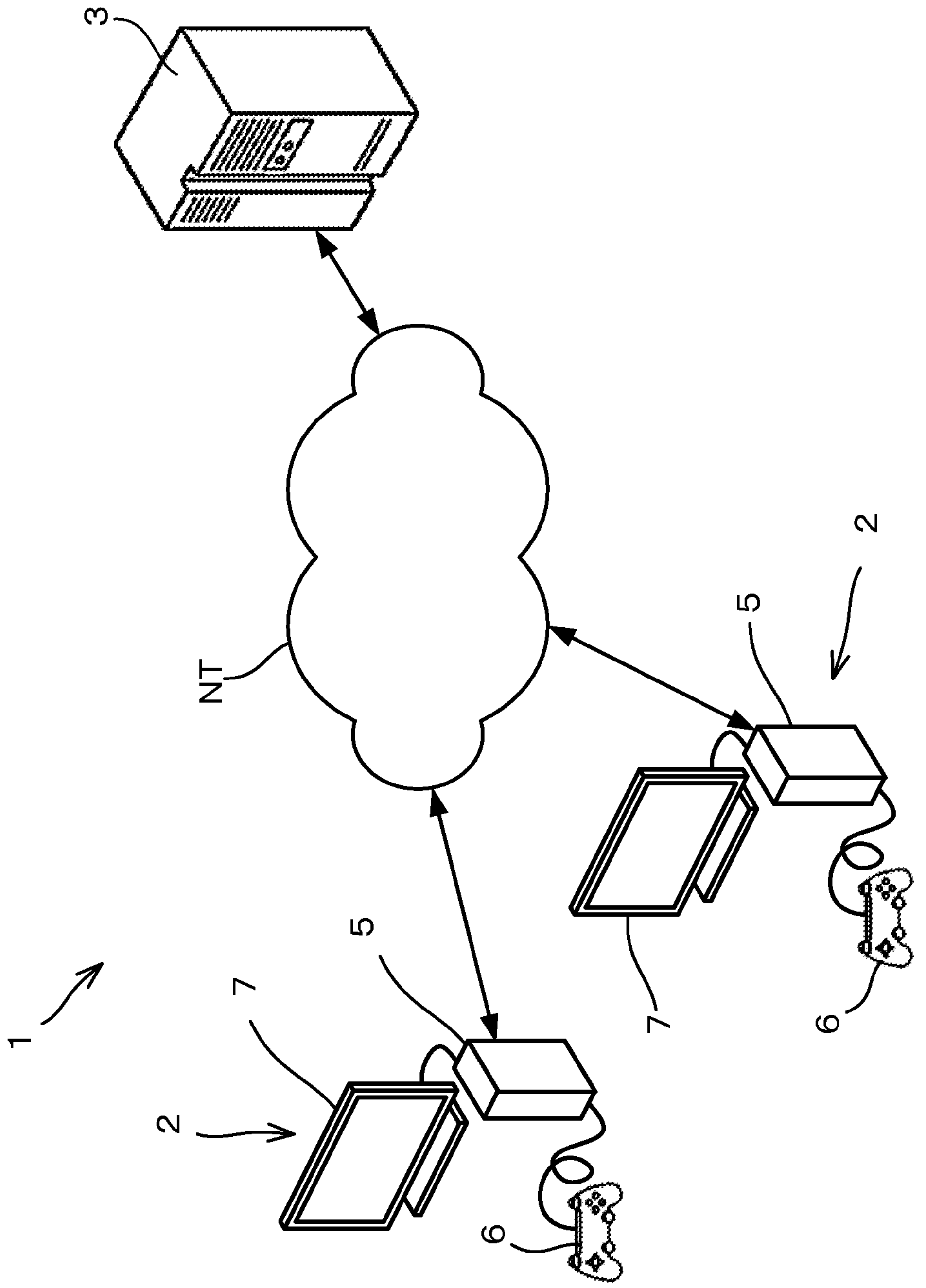
FIG. 1 shows an example of an entire configuration of a game system according to an embodiment of the present invention.

Hereinafter, a game system according to an embodiment of the present invention is described. FIG. 1 shows an example of an entire configuration of the game system according to the embodiment of the present invention. The game system 1 is configured as a client-server system including a plurality of game devices 2 as clients and a server 3 connected to the game devices 2 through a network NT (as an example, the Internet).

Each game device 2 is a device used for game play by a user and is a type of information communication terminal device including functionality for information communication over the network NT. For each game device 2, an appropriate computer device that provides a game may be used. In the example in FIG. 1, a user terminal device is used for each game device 2, although, for example, a commercial game device (installed in a predetermined facility in many cases), which allows a user to play a game in exchange for payment of a predetermined play fee within a scope corresponding to the play fee, may be used for a game device 2.

The user terminal device is a computer device that is network-connectable and is for the personal use of a user. For example, such computer devices include a desktop or notebook personal computer, or a mobile terminal device such as a mobile telephone (including a smartphone), portable game equipment, or a portable tablet terminal device. In the example in FIG. 1, stationary home-use game equipment is used, although any of such various types of computer devices may be used for a game device 2 as appropriate. Although such game devices 2 may be configured as appropriate, each game device 2, as an example, includes a stationary game equipment main unit 5, a controller 6 as an example of an input device connected to the game equipment main unit 5, and a monitor 7 as an example of an output device.

The game equipment main unit 5 is configured mainly to provide a game and, in some cases, is also referred to as consumer game equipment or a game console. The input device is not limited to the controller 6 and, for example, may be an appropriate input device for receiving various play actions (a plurality of types of commands) as inputs, such as a camera for receiving motions as play actions of a user (various commands) as inputs. The output device may include, in addition to the monitor 7, a speaker unit for audio output or the like, depiction of which is omitted. A plurality of monitors 7 may be connected to the game equipment main unit 5.

The server 3 may be configured by combining a plurality of server units as appropriate, or may be configured by using a single server unit. The server 3 may be configured as a cloud server using cloud computing technology. The server 3 provides various game-related services to the game devices 2, for example, a service of matching players to play the game against each other, a service of relaying information on the game to be shared among the game devices 2, and the like. Incidentally, any of various information communication terminal devices, such as a mobile telephone, a smartphone, and a commercial game machine, may be added to the game system 1 as appropriate. For example, a commercial game machine may be used as a client providing a game that works with the game provided by the game devices 2.

Figure 2:
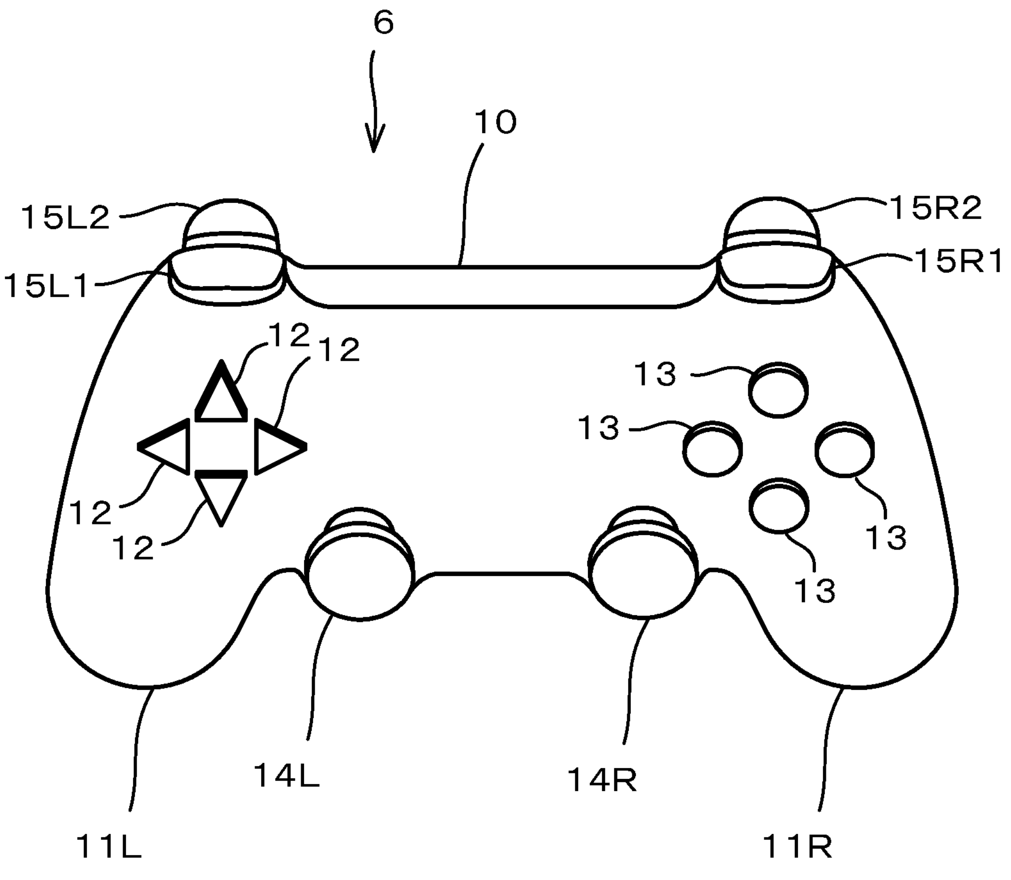
FIG. 2 shows an example of a specific configuration of a controller.

FIG. 2 shows an example of a specific configuration of the controller 6. The controller 6 has a body housing 10 for which a shape and a size are selected based on the premise that a user holds the body housing 10 with both hands. The body housing 10 includes grips 11L, 11R to be gripped by the left and right hands, respectively. Four direction keys 12 are provided in an upper portion of a front face of the left grip 11L, four operation buttons 13 are provided in an upper portion of a front face of the right grip 11R, and a pair of sticks 14L, 14R are provided between the grips 11L, 11R. The sticks 14L, 14R can be operated in all directions from a neutral position, which is a position in an unoperated state, that is, in any of 360° directions. Further, two operation buttons 15L1, 15L2 are provided on an end face on an upper side of the left grip 11L, and two operation buttons 15R1, 15R2 are provided on an end face on an upper side of the right grip 11R. Hereinafter, the left stick 14L and the right stick 14R may be referred to as L stick 14L and R stick 14R, respectively, the left operation buttons 15L1, 15L2 may be referred to as L1 button 15L1, L2 button 15L2 in order from a nearer side to the front face of the controller 6, and the right operation buttons 15R1, 15R2 may be referred to as R1 button 15R1, R2 button 15R2 in order from a nearer side to the front face of the controller 6, to make distinctions in some cases. On the other hand, the sticks 14L, 14R may be collectively referred to as sticks 14, and the operation buttons 15L1, 15L2, 15R1, 15R2 may be collectively referred to as operation buttons 15, in some cases.

Each of the direction keys 12, the operation buttons 13, the sticks 14, and the operation buttons 15 of the controller 6 functions as an example of an operation part of the input device. Of the operation parts, at least one or some operation parts are provided as operation parts of operation amount detection type where what is to be detected is an amount of operation made by a user and an output signal changes depending on the amount of operation. For example, the sticks 14 and the operation buttons 15 are provided as operation parts of such a type. Accordingly, with respect to an operation of each stick 14, a direction in which the operation is executed and an amount of the operation (an angle of a tilt from the neutral position) are detected and reflected in an output signal. With respect to an operation of each operation button 15, an amount of the pressing operation is detected and reflected in an output signal. In contrast, each of the direction keys 12 and the operation buttons 13 is provided as an on-off operation part where what is to be detected is presence or absence of a pressing operation and the presence or absence of the operation is reflected in an output signal. However, such a distinction is an example, and an appropriate configuration is possible. For example, depending on a setting by a user, even an operation part of operation amount detection type may be configured to be switchable on software such as to function as an on-off operation part where only presence or absence of an operation is to be detected.

Next, the game provided via a game device 2 is described with reference to FIG. 3. In the game system 1 of the present embodiment, a match-type soccer game is provided in which a user of a game device 2 plays against an opposition (opponent) user through soccer. The opposition may be a real user using any one game device 2, or may be a virtual entity controlled by a computer of the game device 2 or the server 3. A match does not necessarily need to be one-to-one. For example, soccer may be played in the form of a so-called group match that is played by a group including at least one user against another group.

Figure 3:
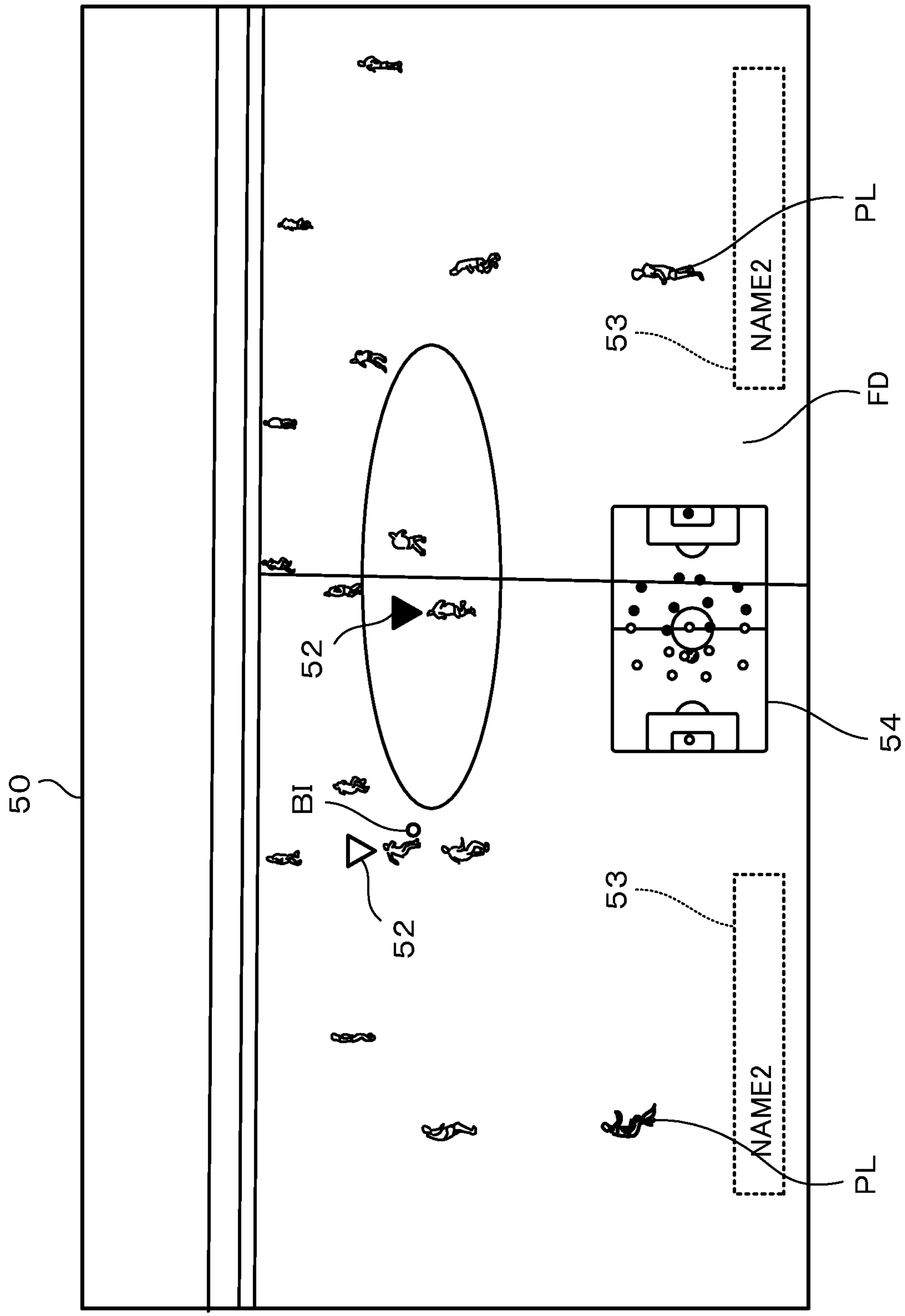
FIG. 3 schematically shows an example of a full screen.

FIG. 3 schematically shows an example of a full screen. In the soccer game, while various game screens can be used as appropriate, the full screen 50 is a game screen for displaying a whole field of the soccer game. Specifically, in the soccer game, a viewpoint can be automatically changed to an optimal position according to a situation of a match, and a game screen corresponding to the viewpoint can be displayed on the monitor 7. The full screen 50 corresponds to observation from a predetermined viewpoint from which a scene of the whole field can fit into the screen. In such a case, as shown in FIG. 3, the full screen 50 includes players (a reference sign is applied to only some players) PL, a ball BI, and a field FD.

Each of the players PL and the ball BI is an example of an object that moves in a virtual space of the game, and each player PL corresponds to each member included in a soccer team. Each team includes a plurality of players PL, and a user team associated with the user and an opposing team associated with the opposition are formed. Accordingly, the soccer game is configured as a team-match game in which the user team plays against the opposing team.

On the other hand, the ball BI is an object corresponding to a ball in soccer and is maneuvered in such a manner as to make a movement or the like according to motion of each player PL. The field FD is an area corresponding to a soccer field (pitch) and a main activity area for the players PL. The field FD is demarcated by various lines such as touchlines or goal lines. The players PL use the field FD for the activity area on most occasions, although there are some occasions when the players PL act out of the lines. In the soccer game, as is commonly known, each of the user's and the opposition's players PL act as in real soccer within the virtual field FD, whereby the match progresses.

One or some of the players in the field FD are configured as players PL to be operated by users. For one user, one player PL is selected as an operation target. For example, when a user is on an offensive side, a player PL that should possess the ball BI is set as the user's operation target, while for a defensive-side user, a player PL in charge of defending the player PL possessing the ball BI is selected as the operation target. Moreover, operation-target players PL are switched as appropriate according to an operation (a command to change the target) by a user. Operation of the operation-target player PL can include various operations of appropriate operation parts and, as an example, includes an operation of the stick 14L. Specifically, in the full screen 50, the operation-target player PL moves in a direction in which the stick 14L is operated. In the full screen 50, the operation-target player PL is identifiable, for example, by a cursor 52.

As an example, cursors 52 are displayed for the current operation-target player PL and a player PL expected to change to the operation target next at a command to change the target, although a cursor 52 may be displayed only for the current operation-target player PL. The cursors 52 may be identified as appropriate. In the example in FIG. 3, the cursor 52 for the current operation-target player PL is displayed in white, while the cursor 52 indicating the player PL expected to change to the operation target next is displayed in black. In other words, the cursors 52 are displayed in such a manner as to be identifiable by difference in color. In addition, an information portion 53 indicating a name or the like of the operation-target player PL may be added to the full screen 50. Motion of the operation-target player PL is controlled based on the user's operation of the controller 6. On the other hand, motion of non-operation-target players PL is automatically controlled according to situations of the match.

Moreover, besides the above, the full screen 50 may include various objects or information as appropriate, and includes a map 54 in the example in FIG. 3. The map 54 is an image (information) indicating a position of each player PL in the whole field FD. In the example in FIG. 3, the map 54 is placed in a bottom middle portion, although the map 54 may be arranged at an appropriate place in the full screen 50. Further, information indicating a situation of the match, such as names of the user and opposing teams, scores, or elapsed time, may be displayed at an appropriate place in the full screen 50.

Figure 4:
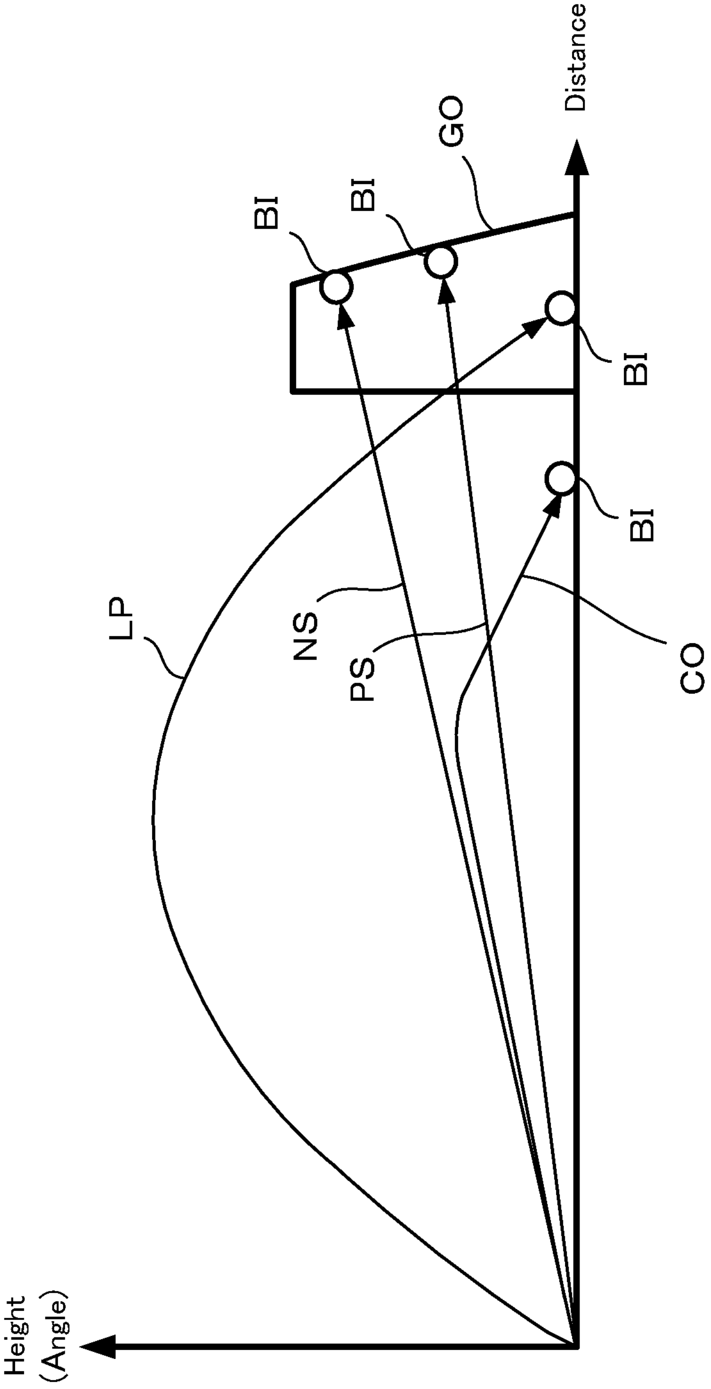
FIG. 4 is an explanatory diagram for describing an example of types of shots.

Next, types of shots prepared in the soccer game are described with reference to FIGS. 4 to 8. FIG. 4 is an explanatory diagram for describing an example of types of shots. In the soccer game, each player PL may be allowed to perform appropriate motions conforming to real soccer, such as various kicks and accompanying passes, and such motions include shooting. The example in FIG. 4 shows four types of shots, although various types of shots can be prepared in the soccer game. Although characteristics of the shots can be explained in various terms, the example in FIG. 4 shows a case where a characteristic of each shot is explained in terms of height and distance. Specifically, the example in FIG. 4 shows typical trajectories (trajectories in a vertical direction from the field FD) that the four types of shots draw. In the example in FIG. 4, a horizontal axis indicates the distance, and a vertical axis indicates the height (angle). In such a case, as shown in FIG. 4, shots executed by each player PL include a lob shot LP, a normal shot NS, a control shot CO, and a power shot PS, which are configured to draw mutually different trajectories.

Specifically, the lob shot LP is a shot generated with a trajectory describing a gentle parabola. The lob shot LP describes the highest trajectory, among the four types of shots. In the lob shot LP, the ball BI immediately after hit (immediately after kicked) by a player PL is at a high position, but a drop is great for a distance of movement in a horizontal direction. Accordingly, in many cases, the lob shot LP is used when a trajectory going over the head of a goalkeeper is needed.

Each of the normal shot NS and the power shot PS is a shot generated with a similar linear trajectory. The shots, which also draw parabolas falling with distance naturally, are the same type of shots, each having a trajectory that moves straight in a predetermined direction. In other words, each of the normal shot NS and the power shot PS moves in a straight line in a predetermined direction, without going off the line in the horizontal direction. Differences between the normal shot NS and the power shot PS are height and speed. Specifically, the power shot PS is a shot generated with a lower height and a higher speed than those of the normal shot NS. Accordingly, the power shot PS is generated with a lower trajectory than that of the normal shot NS. In the present example, the normal shot NS and the power shot PS function as a first shot and a second shot in the present invention, respectively.

On the other hand, the control shot CO is a shot characterized more in a course than in a trajectory. The control shot CO is executed as a shot with higher accuracy in control. Specifically, the control shot CO is generated in such a manner as to take a course that is set depending on a position of the goalkeeper or the like, as a difficult course for the goalkeeper to save. However, since accuracy is prioritized, the speed of the ball BI is slower than that of the normal shot NS. Moreover, in many cases, a movement in the horizontal direction occurs as appropriate through curving or the like to take the course. As a result, if the control shot CO is kicked with the same height as the normal shot NS, it is highly likely that the control shot CO cannot go as long a distance as the normal shot NS and undershoots a place reached by the normal shot NS.

Commands for the lob shot LP, the normal shot NS, the control shot CO, and the power shot PS may be implemented as appropriate. As an example, an operation for deciding the speed and the height of a shot (hereinafter, also referred to as a speed decision operation in some cases) is configured to be common, and an operation for commanding a movement direction (hereinafter, also referred to as a direction command operation in some cases) is configured to be common. For the speed decision operation, as an example, an operation of pressing the operation button 13 disposed on the left side (hereinafter, also referred to as the left operation button 13 in some cases), of the two operation buttons 13 arranged right and left among the four operation buttons 13, is used, although an appropriate operation of each operation part of the controller 6 may be used. Specifically, for each of the lob shot LP, the normal shot NS, the control shot CO, and the power shot PS, both height (climb angle) and speed are decided in such a manner as to increase depending on a length of time for which the left operation button 13 is pressed (duration of the pressing operation), according to a predetermined rule. However, rules of deciding how height and speed increase differ with the types of shots as appropriate. As examples of the predetermined rule, height and speed increase rules for the normal shot NS, the control shot CO, and the power shot PS will be described later. In the present example, the operation of pressing the left operation button 13 functions as a speed command in the present invention.

The direction command operation is an operation for commanding a direction related to the horizontal direction. For the direction command operation, as an example, an operation of the L stick 14L is used, although an appropriate operation of each operation part of the controller 6 may be used. Specifically, each of the lob shot LP, the normal shot NS, the control shot CO, and the power shot PS is generated in such a manner as to move in a direction in which the L stick 14L is operated (tilted). In other words, for each shot, the movement direction in the horizontal direction is implemented by a direction command made on the L stick 14L. More specifically, the movement direction in the horizontal direction is decided by a direction command made on the L stick 14L during a period after the left operation button 13 is pressed and before the ball BI is hit by the player PL, or at a predetermined timing in such a period. However, as for the control shot CO, after the above-described movement direction in the horizontal direction is decided, a change related to the horizontal direction, such as a curve, can be caused by automatic control based on a direction command made on the L stick 14L after the ball BI is hit by the player PL. Accordingly, although the control shot CO initially moves in a commanded direction according to a direction command operation, the direction is not necessarily maintained and is automatically adjusted as appropriate. The control shot CO therefore is different from the other shots to the extent that a command for a movement direction is reflected. In the present example, the operation of the L stick 14L functions as a direction command in the present invention.

The types of the lob shot LP, the normal shot NS, the control shot CO, and the power shot PS may be determined as appropriate. As an example, when only the left operation button 13 is operated, it is determined that height and speed are decided for the normal shot NS. In other words, when a pressing operation is performed only on the left operation button 13, the pressing operation (speed decision operation) is determined to be a command for the normal shot NS, and the normal shot NS having a speed and the like according to the duration of the pressing operation is implemented.

On the other hand, the lob shot LP, the control shot CO, and the power shot PS are determined based on a type designation operation of proactively designating a type of shot. In other words, commands for the shots LP, CO, PS are implemented based on a combination of three operations, the direction command operation (which may be omitted as appropriate, in which case the shot may move in a predesignated direction), the speed decision operation, and the type designation operation. For the type designation operation, as an example, operations of the L1 button 15L1 and the R2 button 15R2 are adopted, although any of various operations of the individual operation parts of the controller 6 may be adopted. Specifically, an operation of pressing the L1 button 15L1 functions as the type designation operation of commanding the lob shot LP, and an operation of pressing the R2 button 15R2 functions as the type designation operation for the control shot CO or the power shot PS, depending on the operation amount of the operation. In other words, proactive operations of the same R2 button 15R2 are used for the type designation operations for the control shot CO and the power shot PS, and are used differently to command the control shot CO and to command the power shot PS, depending on the operation amounts of the operations. In the present example, the R2 button 15R2 functions as a shooting operation part in the present invention. The two operations for the normal shot NS, which are the direction command operation and the speed decision operation, or the three operations for the other shots, which are the direction command operation, the speed decision operation, and the type designation operation, function as shooting operations in the present invention.

Incidentally, since the climb angle and the movement speed of the ball BI in the lob shot LP, the normal shot NS, the control shot CO, and the power shot PS depend on the duration of the operation of pressing the left operation button 13 as described above, relations between the heights of the shots in the example in FIG. 4 are only an example for explanatory convenience, and can change depending on the user's operation. Moreover, although the example in FIG. 4 shows the four types of shots LP, CO, NS, PS, similar passes may be prepared. Alternatively, there are some cases where the four types of shots LP, CO, NS, PS function as passes when an own-side player PL is present on a trajectory. Accordingly, the four types of shots LP, CO, NS, PS are not limited to shots, and may function as four types of passes.

Figure 5:
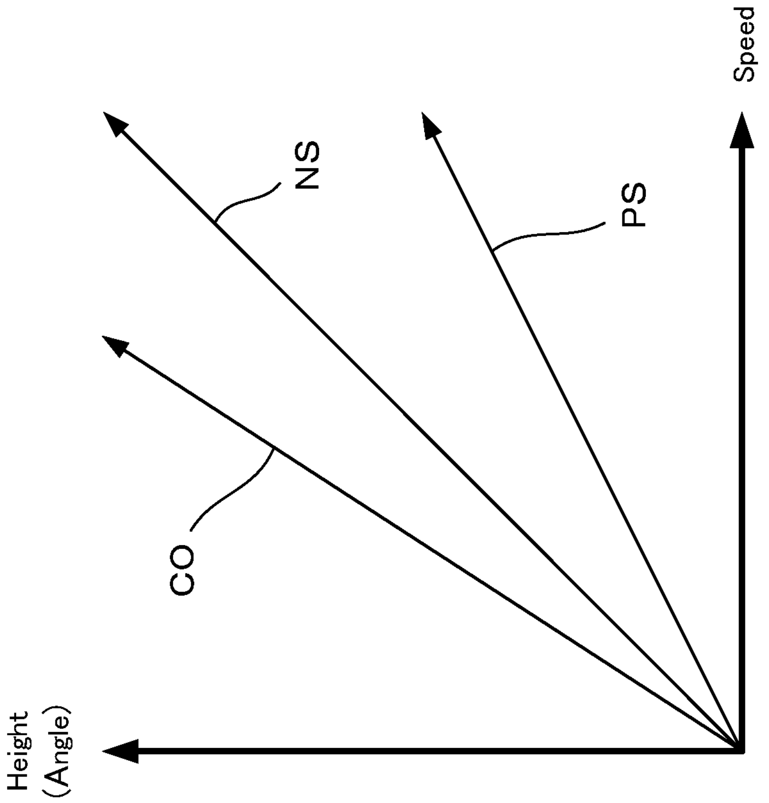
FIG. 5 is an explanatory diagram for describing an example of height and speed increase rules according to types of shots.

FIG. 5 is an explanatory diagram for describing an example of the height and speed increase rules for the normal shot NS, the control shot CO, and the power shot PS. Appropriate rules that are different among the shots NS, CO, PS may be applied as the rules by which the climb angle and the movement speed of the ball BI increase depending on the duration of the pressing operation of the left operation button 13. The example in FIG. 5 shows a case where a rule for linear increases is applied to each shot, although, for example, a rule for quadratic (parabolic) increases, a rule for exponential increases, or a rule for stepwise increases may be applied. In the example in FIG. 5, a horizontal axis indicates the speed (movement speed) of the ball BI in each shot, and the vertical axis indicates the height (climb angle) of the ball BI in each shot. Incidentally, changes of each line in the example in FIG. 5 are only an example for explanatory convenience, and slopes relative to changes in speed (the climb angle of each line against the speed axis) are not limited to the example in FIG. 5. Moreover, in a graph in the example in FIG. 5, each arrow corresponds to a line (trend) representing an example of the rule for each shot, and a reference sign corresponding to each shot is applied to the line corresponding to each shot for the purpose of explanatory convenience. The same holds true in FIG. 7.

As shown in FIG. 5, the height and speed increase rules for the normal shot NS, the control shot CO, and the power shot PS, which draw different lines, are configured so that the ratio of a change in height to a change in speed becomes higher in the order of the power shot PS, the normal NS, the control shot CO. In other words, the increase rules for the normal shot NS, the control shot CO, and the power shot PS, each of which indicates an increasing trend corresponding to a linear function, are configured so that the slope of the linear function (in other words, a constant by which speed is multiplied) becomes steeper in the order of the power shot PS, the normal shot NS, the control shot CO. Accordingly, when speed is the same, a shot has a lower climb angle and draws a lower trajectory (flight path) in the order of the power shot PS, the normal shot NS, the control shot CO. In other words, when the duration of the pressing operation of the left operation button 13 is the same, the movement speed of the ball BI is higher in the order of the power shot PS, the normal shot NS, the control shot CO.

Figure 6:
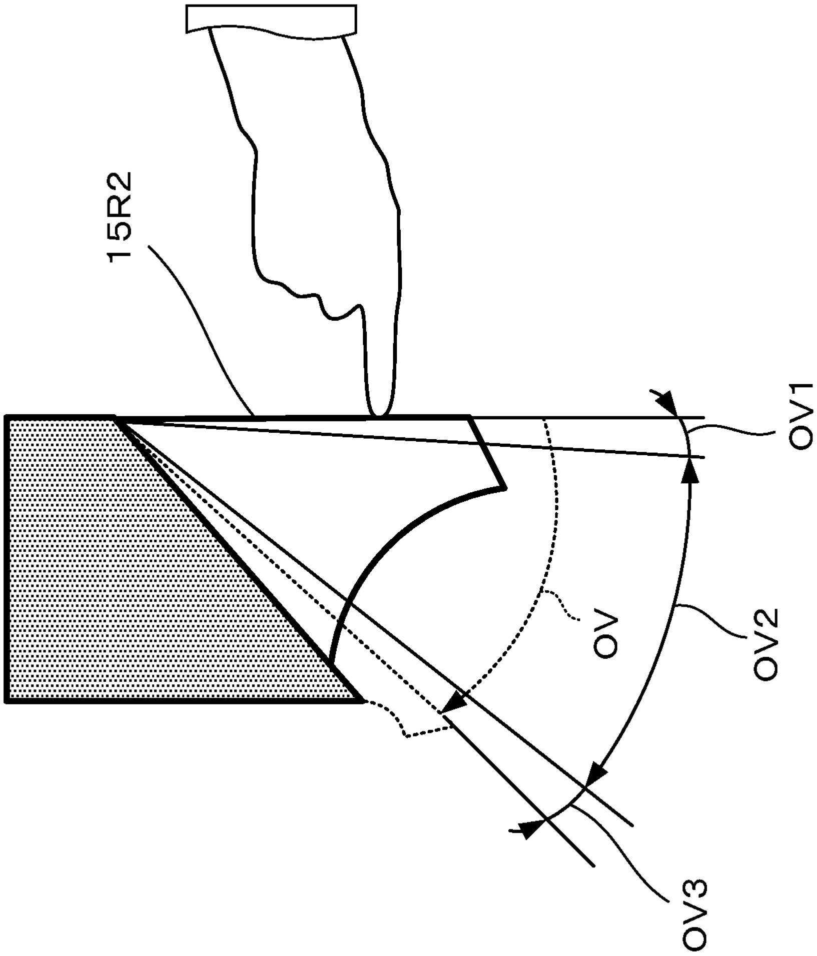
FIG. 6 is an explanatory diagram for describing an example of type designation operation.

FIG. 6 is an explanatory diagram for describing an example of the type designation operations of commanding the control shot CO and the power shot PS. Specifically, the example in FIG. 6 shows a case where the different commands for the control shot CO and for the power shot PS are used depending on the operation amounts of the pressing operations of the R2 button 15R2. In such a case, as shown in FIG. 6, the R2 button 15R2 changes states, depending on the user's pressing operation (which is performed with the forefinger of the right hand, in many cases), from an unoperated state to a maximumly operated state (may change to an appropriate one of phases including continuous phases), and three ranges, first range OV1 to third range OV3, are provided for operation amounts (pressing amounts) OV between the unoperated state and the maximumly operated state.

The first range OV1 is a range associated with no operation. Although the range associated with no operation may be omitted, the range is provided in the example in FIG. 6 as a margin range (which may be an appropriate small range) that falls in a category of no operation, in view of preventing erroneous operations. Moreover, as described above, the normal shot NS is commanded by the pressing operation of the left operation button 13, without requiring an operation of the R2 button 15R2. Consequently, since no operation also functions as a command for the normal shot NS, the first range OV1 also functions as an operation amount to which the normal shot NS is assigned.

On the other hand, each of the second range OV2 and the third range OV3 is a range that is determined to be a proactive operation. Specifically, the second range OV2 and the third range OV3 are ranges associated with commands for the control shot CO and the power shot PS, respectively. In other words, the second range OV2 functions as an operation amount assigned to the command for the control shot CO, and the third range OV3 functions as an operation amount assigned to the command for the power shot PS. Although the second range OV2 and the third range OV3 may be set as appropriate between the unoperated state and the maximumly operated state, as an example, the third range OV3 is set to operation amounts in a range where the maximumly operated state is determined, and the second range OV2 is set to operation amounts that are determined to be other operations than a maximum operation when the R2 button 15R2 is proactively operated. In other words, the maximum operation of pressing the R2 button 15R2 up to a maximum amount (an operation falling in the third range OV3) is assigned to the power shot PS, and a mid-operation of pressing the R2 button 15R2 to a middle point that does not go far to the maximum amount (an operation falling in the second range OV2) is assigned to the control shot CO. In the present example, the control shot CO functions as a third shot in the present invention. The maximum operation of the R2 button 15R2 (an operation falling in the third range OV3) functions as a specific command and a second operation in the present invention, and the mid-operation (an operation falling in the second range OV2) functions as a third operation in the present invention.

Figure 7:
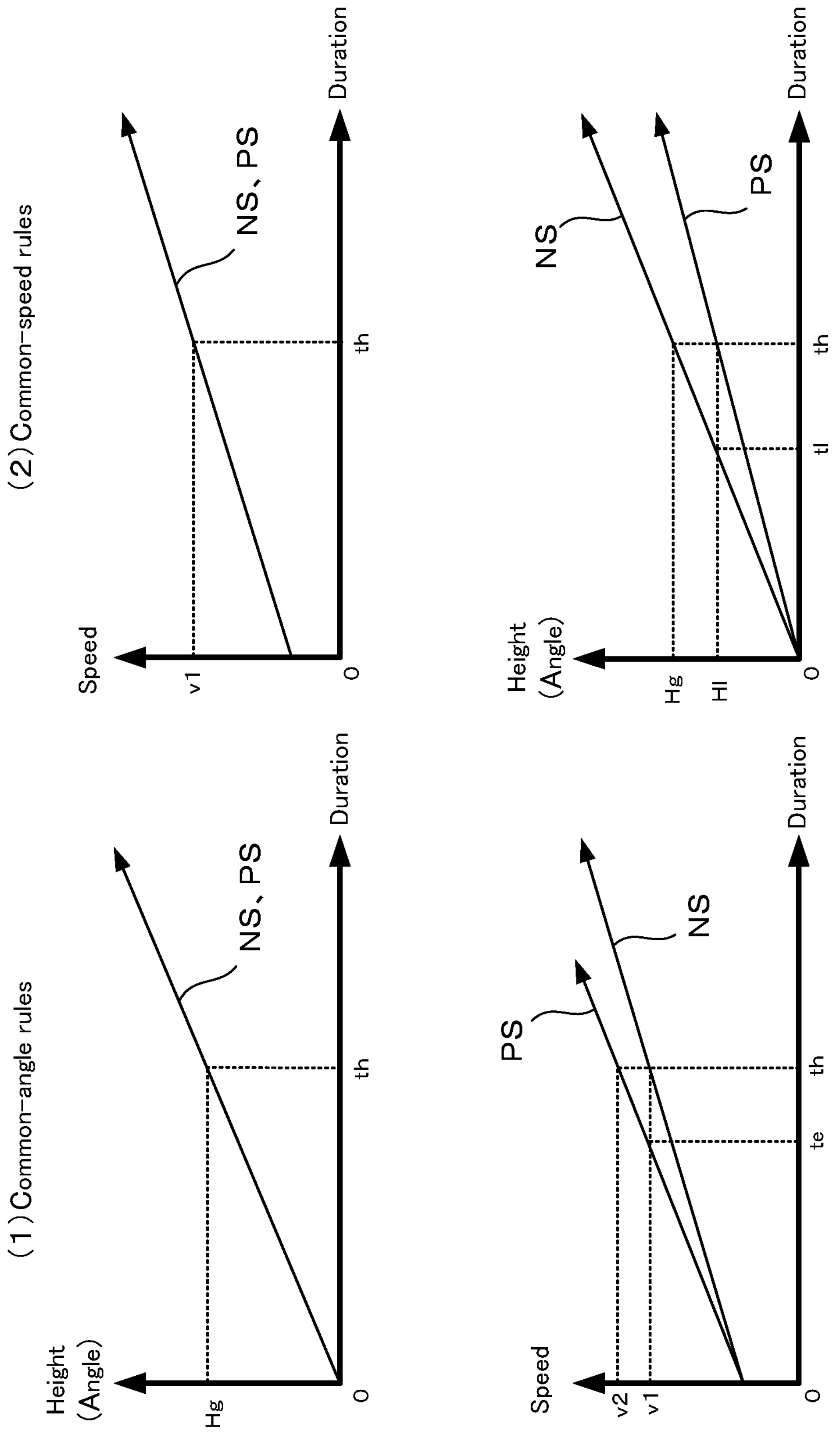
FIG. 7 is an explanatory diagram for describing examples of height and speed increase rules for implementing a power shot.

FIG. 7 is an explanatory diagram for describing examples of the height and speed increase rule for implementing the power shot PS. The power shot PS and the normal shot NS have different height and speed increase rules, but are categorized as the same type of shots that draw similar linear trajectories in the horizontal direction. Accordingly, in the example in FIG. 7, the increase rules for the power shot PS are shown in such a manner as to be compared to the increase rule for the normal shot NS. Specifically, for the power shot PS, appropriate rules can be applied that bring about a portion where height is lower and speed is faster than those according to the increase rules for the normal shot NS. The example in FIG. 7 shows a case where (1) common-angle rules and (2) common-speed rules are applied as the increase rules for the power shot PS. The (1) common-angle rules are rules in which an increase rule of climb angle is in common with an increase rule for the normal shot NS. On the other hand, the (2) common-speed rules are rules in which an increase rule of speed is in common with an increase rule for the normal shot NS. At (1) in FIG. 7, an upper graph represents the increase rule with respect to the climb angle of the ball BI, and a lower graph represents an increase rule with respect to the movement speed. At (2) in FIG. 7, an upper graph represents the increase rule with respect to the movement speed of the ball BI, and a lower graph represents an increase rule with respect to the climb angle.

As shown at (1) in FIG. 7, when the common-angle rules are applied to the increase rules for the power shot PS, the increase rate of the movement speed of the ball BI against the duration of the pressing operation of the left operation button 13 is made higher than that of the normal shot NS, whereby the power shot PS that is lower and faster than the normal shot NS is implemented. Specifically, in the upper graph at (1) in the example in FIG. 7, a horizontal axis indicates the duration of the pressing operation of the left operation button 13 and a vertical axis indicates the climb angle (height) of the ball BI, and the increase rate (the pace of increase) of the climb angle of the ball BI against the duration of the pressing operation is configured to be linear so that the power shot PS increases similarly to the normal shot NS. For example, when a height Hg on the linear line corresponds to the height of a goal GO (a height at which a crossbar is positioned, the vertical length of a goal frame), both the power shot PS and the normal shot NS reach the height Hg at the same time (after the duration of the pressing operation) th.

On the other hand, in the lower graph at (1) in the example in FIG. 7, a vertical axis indicates the speed (movement speed) of the ball BI and a horizontal axis, as in the upper graph, indicates the duration of the pressing operation of the left operation button 13, and the increase rate (slope) of the speed of the power shot PS is configured to be greater than that of the normal shot NS. For the increase rate of the power shot PS, an initial value (a value corresponding to an intercept of the linear function) may be an appropriate value, and may be set to a smaller value than an initial value for the increase rate of the normal shot NS. As an example, the initial value is set to an equal value to the initial value (which may be an appropriate value) for the increase rate of the normal shot NS. Accordingly, for example, after the duration th of the pressing operation (at the time when the height Hg corresponding to the height of the goal GO is reached), the respective movement speeds of the normal shot NS and the power shot PS reach a movement speed v1 and a movement speed v2, respectively, and the movement speed v2 of the power shot PS is higher than the movement speed v1 of the normal shot NS. As a result, when the (1) common-angle rules are applied to the increase rules for the power shot PS, the power shot PS having a higher movement speed (for example, the movement speed v2) than that of the normal shot NS after the same duration (for example, the duration th) is implemented. Moreover, since the power shot PS reaches the movement speed v1 after duration te, the power shot PS functions as a lower and faster shot than the normal shot NS, for example, when duration is between the duration th and the duration te.

Similarly, as shown at (2) in FIG. 7, when the common-speed rules are applied to the increase rules for the power shot PS, the increase rate of the climb angle of the ball BI against the duration of the pressing operation of the left operation button 13 is kept less than that of the normal shot NS, so that the power shot PS that is lower and faster than the normal shot NS is implemented. Specifically, the upper graph at (2) in the example in FIG. 7 has similar vertical and horizontal axes to those of the lower graph at (1), and the increase rate of the movement speed of the ball BI against the duration of the pressing operation is configured to be linear so that the power shot PS increases similarly to the normal shot NS. On the linear line, when the pressing operation of the left operation button 13 is continued up to time th, the movement speed of the ball BI reaches the speed v1 as in the lower graph at (1). In other words, an operation for the duration th implements both the power shot PS and the normal shot NS as shots having the movement speed v1.

On the other hand, the lower graph at (2) in the example in FIG. 7 has similar vertical and horizontal axes to those of the upper graph at (1), and the increase rate (slope) of the climb angle of the power shot PS is configured to be smaller than that of the normal shot NS. Moreover, for the increase rate of the power shot PS, an initial value (a value corresponding to an intercept of the linear function) may be an appropriate value, and may be different from an initial value for the increase rate of the normal shot NS. As an example, the initial value is set to "0", which is the same as the initial value for the increase rate of the normal shot NS. Accordingly, for example, after the duration th of the pressing operation, the respective heights of the normal shot NS and the power shot PS reach a height Hg and a height Hl, respectively, and the height Hl of the power shot PS is smaller than the height Hg of the normal shot NS. Since the height Hg corresponds to the height of the goal GO (the height where the crossbar is positioned, the vertical length of the goal frame), the pressing operation of the left operation button 13 cannot be continued for the duration th or more in order to bring the normal shot NS within the frame of the goal GO, while for the power shot PS, the pressing operation of the left operation button 13 can be continued for more than the duration th. As a result, when the (2) common-speed rules are applied to the increase rules for the power shot PS, the power shot PS having a lower height (for example, the height Hl) than the normal shot NS is implemented after the same duration (for example, the duration th). Moreover, since the normal shot NS reaches the height Hl after duration t1, the power shot PS functions as a lower and faster shot than the normal shot NS, for example, when duration is between the duration t1 and the duration th. In the present example, a combination of the increase rules for the normal shot NS represented by the upper graphs at (1) and (2) functions as a first rule in the present invention. The rules for the power shot PS shown at (1) or (2) function as a second rule in the present invention.

Figure 8:
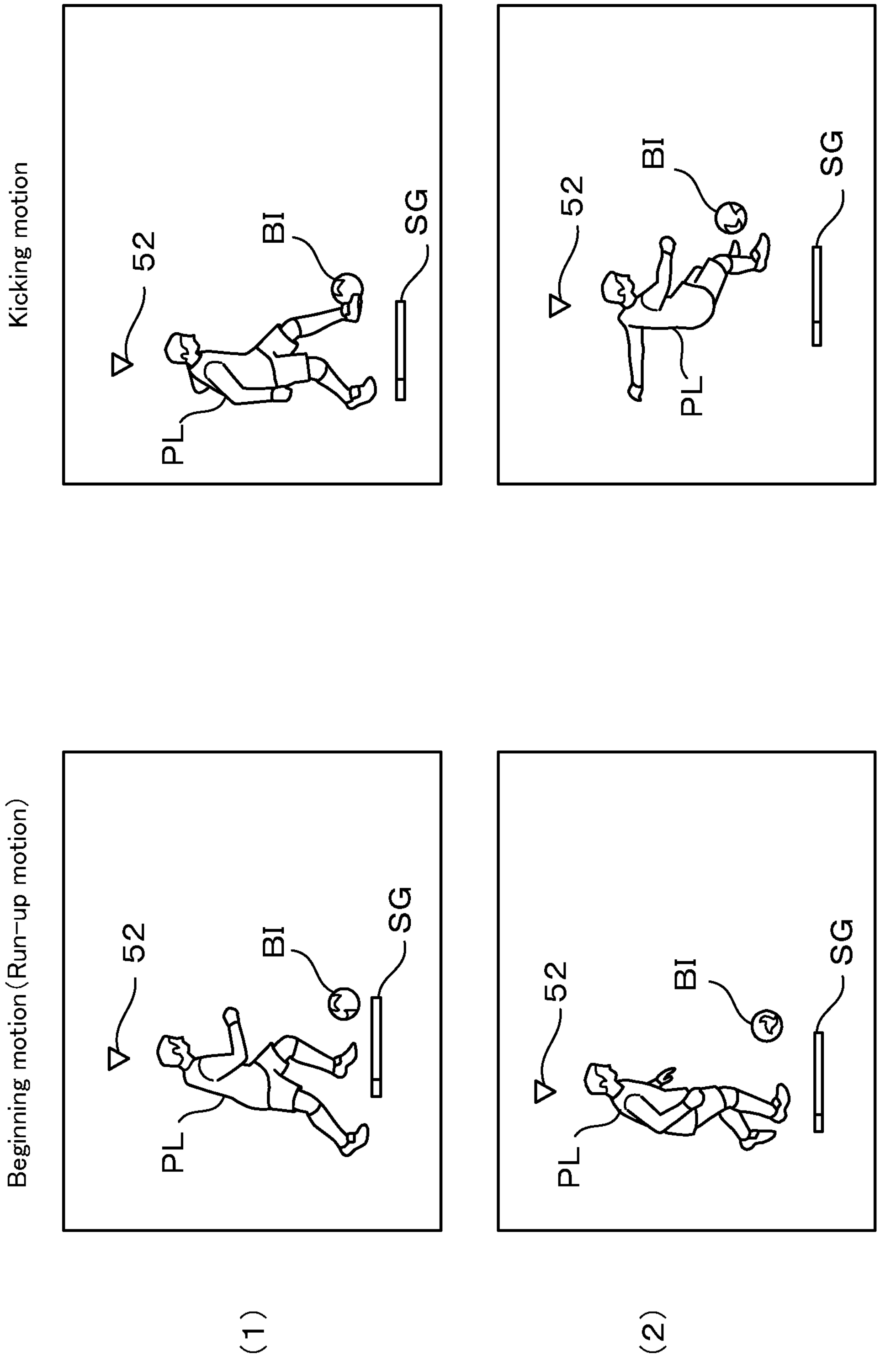
FIG. 8 schematically shows examples of shooing motions according to types of shots.

FIG. 8 schematically shows examples of motions of a player PL when the power shot PS and the normal shot NS are executed. Specifically, (1) of the examples in FIG. 8 shows shooting motions performed by a player PL in the case of the normal shot NS, and (2) shows shooting motions performed by a player PL in the case of the power shot PS. Although the shooting motions may match between the power shot PS and the normal shot NS, the examples in FIG. 8 show a case where the shooting motions are different between the power shot PS and the normal shot NS. In the examples in FIG. 8, at both (1) and (2), a left side shows a motion when the shooting motions begin, and a right side shows a motion of kicking the ball BI, of a series of motions from the beginning to the end of the shooting motions. Moreover, in the examples in FIG. 8, each player PL in the full screen 50 is displayed in an enlarged manner. In such a case, as shown in FIG. 8, each series of shooting motions includes a beginning motion and a kicking motion, which are different between the power shot PS and the normal shot NS.

Specifically, the player PL performs a motion of approaching the ball BI (a run-up motion of running) in the beginning motion for each of the power shot PS and the normal shot NS, but in the power shot PS, performs the motion in such a manner as to approach the ball BI from a farther position (run longer) than in the normal shot NS. As a result, the power shot PS requires a longer time than the normal shot NS before the kicking motion is started. Similarly, in the kicking motion, the player PL is about to kick the ball BI for each of the power shot PS and the normal shot NS, but the motion for kicking is larger for the power shot PS than for the normal shot NS. Accordingly, in the kicking motion, the power shot PS also requires a longer time than the normal shot NS before the ball BI is actually kicked. In other words, the shooting motions for the power shot PS are performed in such a manner as to take a longer time than the shooting motions for the normal shot NS.

A difference in time from the beginning to the end of the shooting motions caused between the power shot PS and the normal shot NS may be set as appropriate, and may vary, for example, according to the user's operation such as the duration of the pressing operation of the left operation button 13. As an example, the different is uniformly set to approximately 0.3 seconds, regardless of the user's operation. Specifically, for example, the normal shot NS is configured to complete the series of shooting motions up to the kicking motion in approximately 0.3 seconds, while the power shot PS is configured to take approximately 0.6 seconds to complete the similar series of shooting motions. Obviously, a similar delay occurs to time at which the ball BI starts moving as a shot. Then, there is a possibility that the shot is intercepted as various defensive motions, such as a tackling motion, of a defending-side player PL (a player PL of the opposition) are allowed against each of the normal shot NS and the power shot PS during the shooting motions. Accordingly, the longer the time required for the shooting motions is, the higher the probability is that the shot is intercepted (interrupted en route). The power shot PS is lower and faster than the normal shot NS as described above and is highly likely to be an effective shot. Accordingly, by making the time required for the shooting motions longer (increasing the probability of being intercepted), the power shot PS and the normal shot NS are balanced. As an example, such a disadvantage of the power shot PS is provided through the time required for the shooting motions, although such a disadvantage does not need to be provided.

In the examples in FIG. 8, for both the power shot PS and the normal shot NS, a speed gage SG is provided under the player PL. The speed gage SG is a gage that increases with the duration of the pressing operation of the left operation button 13. In other words, the speed gage SG is a gage for indicating a guide based on which the height (climb angle) and the speed of the ball BI are decided for the power shot PS or the normal shot NS. Although the speed gage SG, that is, the guide for the duration of the pressing operation may be omitted, as an example, the speed gage SG is displayed under a player PL possessing (controlling) the ball BI at least when the pressing operation of the left operation button 13 is started. Moreover, as an example, the increase rate of the speed gage SG is consistent between the power shot PS and the normal shot NS so that the gage SG increases with the duration, although the increase rate may differ between the power shot PS and the normal shot NS in such a manner as to reflect the increase rules of speed or the like.

Figure 9:
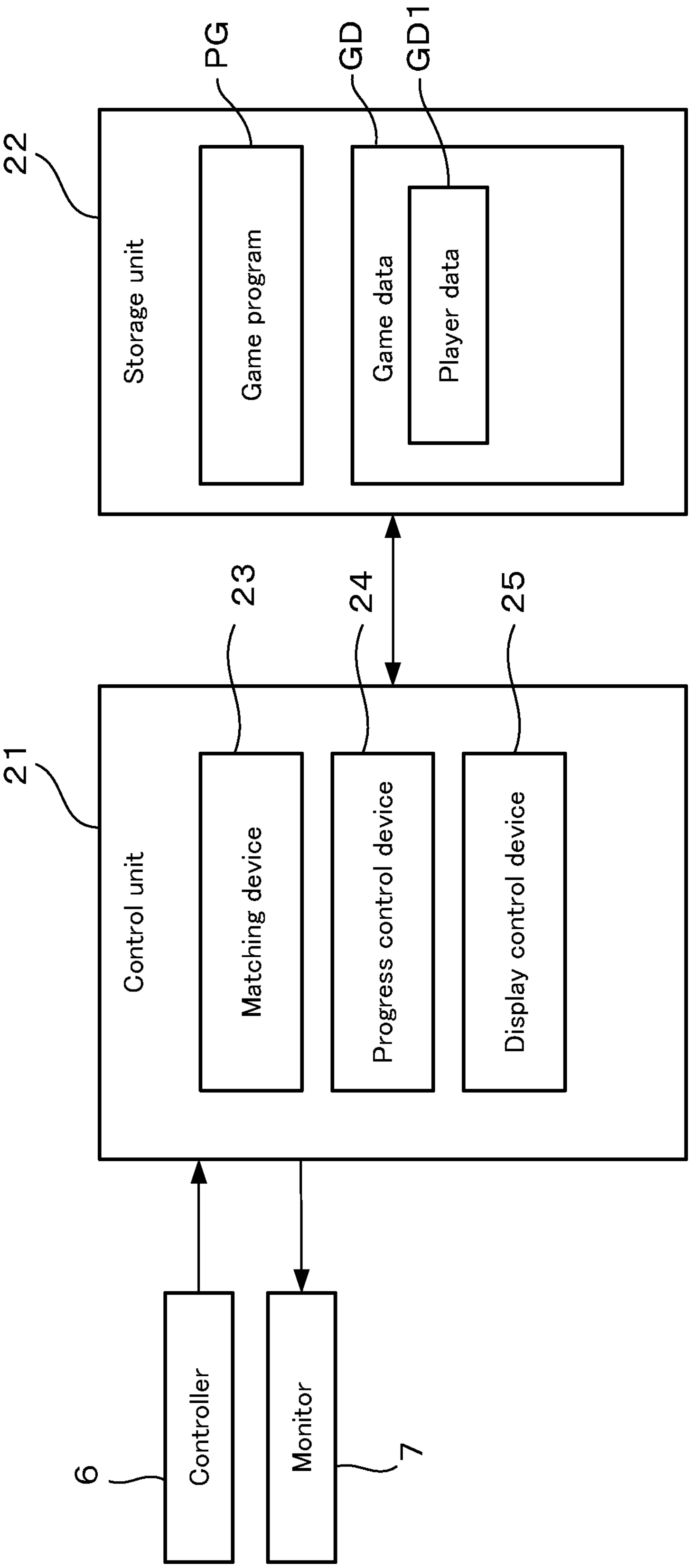
FIG. 9 is a functional block diagram showing essential parts of a control system of a game device.

Next, essential parts of a control system of the game device 2 are described with reference to FIG. 9. The game device 2 includes a control unit 21 as a computer and a storage unit 22 as a storage. The control unit 21 is configured as a computer in which a CPU, as an example of a processor that executes various processing according to a predetermined computer program, and any other peripheral device including an internal memory required for operation of the CPU are combined. The control unit 21 includes various logical devices that are implemented by a combination of a hardware resource of the control unit 21 and a game program PG as a software resource. An example in FIG. 9 shows a matching device 23, a progress control device 24, and a display control device 25.

The matching device 23 is a logical device executing various processing related to matchmaking between a user and an opponent. For example, when a user plays a match against another user (opposition) who plays the soccer game by using another game device 2, matchmaking is required via the server 3, and the matching device 23 executes various commonly known processing related to such matchmaking.

The progress control device 24 is a logical device executing various processing for controlling progress of the game. Such processing includes processing of changing various game screens for playing the soccer game as appropriate, processing of measuring various times, or processing of performing determination according to various rules and the like. As an example of such processing, the progress control device 24 executes shot decision processing. Details of a procedure for the shot decision processing will be described later.

The display control device 25 is a logical device executing various processing for controlling display of various objects included in a game screen. Such processing includes, for example, processing of causing the user's operation-target player PL to perform a motion according to a result of the user's operation in the full screen 50, and processing of acquiring a result of the opposition's operation via the server 3 and causing the opposition's operation-target player PL to perform a motion based the operation result. For example, the processing executed by the display control device 25 includes processing of displaying various movements of the ball BI corresponding to a shot or the like, and processing of causing a player PL to move in such a manner as to execute a shot or the like. As an example of such processing, the display control device 25 executes display control processing. Details of a procedure for the display control processing will be described later.

The storage unit 22 is an external storage device implemented by a storage unit including a non-volatile storage medium (computer-readable storage medium) such as a hard disk or a semiconductor storage device. Various data is recorded in the storage unit 22, together with the above-mentioned game program PG, and the example in FIG. 9 shows game data GD. The game data GD is data for allowing the user to play the soccer game, according to the game program PG. The game data GD may include various data, such as image data for displaying various images for the soccer game and background music data for reproducing various background music. The example in FIG. 9 shows player data GD1.

The player data GD1 is data for defining various characters included in the soccer game. Such characters include players PL, and, as an example, various parameters defining each player PL are recorded in the player data GD1. Such parameters include, for example, a name, am image, running ability, kicking ability, or the like.

Besides the above, various data, such as play data or ID data, may be stored in the storage unit 22 as appropriate. The play data is data in which information related to a past play record of each user is described. For example, the play data is used to carry play results up until a previous match (past records) over into subsequent matches, or to carry over settings unique to each user. For example, when each player PL of the soccer game grows according to a situation of play, information on a parameter for such growth may be managed as appropriate. As an example, such information is managed as a past record by using the play data. In such a case, a parameter for each player PL is reproduced based on a combination of the play data (a change) and the player data GD1 (an initial value). The ID data is data for managing various IDs. Such data includes a user ID for identifying each user. Since the play data is managed via the user IDs, each user ID is used for generation, acquisition, or the like of play data. Although the play data, the ID data, and the like may be stored in the storage unit 22 as appropriate, as an example, the data is provided from the server 3 so that as much data as required is included.

Although various output devices and input devices can be connected to the control unit 21 as appropriate, the example in FIG. 9 shows the above-described controller 6 and the monitor 7. The monitor 7 is a commonly known display device for displaying various game screens for the soccer game, such as the full screen 50 or a matchup screen 60. The monitor 7 displays various game screens (images) for providing the soccer game, according to output signals from the control unit 21. Similarly, the controller 6 is a commonly known input device including various operation parts. The controller 6 outputs signals according to various operations of the individual operation parts to the control unit 21.

Figure 10:
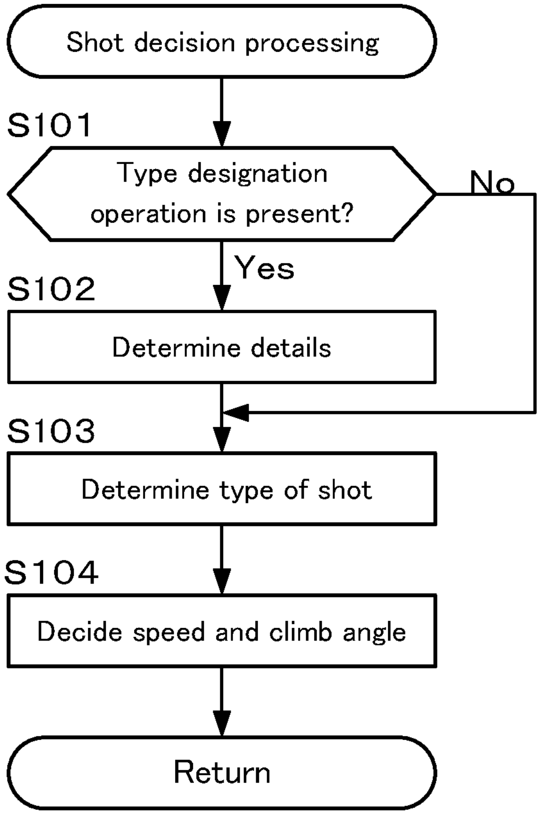
FIG. 10 is a flowchart showing an example of a procedure for shot decision processing.

Next, the shot decision processing and the display control processing are described with reference to FIGS. 10 to 11. The shot decision processing is processing for, when a shot is commanded by the user, deciding the type of the shot, speed, and the like based on the command. An example in FIG. 10 shows the shot decision processing when a shot is commanded based on the speed decision operation and the type designation operation. In such a case, each time the speed decision operation (for example, the operation of pressing the left operation button 13) is executed in a game screen, such as the full screen 50, in which shooting by a player PL (in other words, the user's command for a shot) is allowed, the progress control device 24 starts the shot decision processing in FIG. 10 and first determines whether or not the type designation operation is present (step S101). As an example, the type designation operation is implemented by the pressing operation of the L1 button 15L1 or the R2 button 15R2. Accordingly, in step S101, the progress control device 24 determines whether or not the pressing operation of the L1 button 15L1 or the R2 button 15R2 is executed. When the pressing operation of the L1 button 15L1 or the R2 button 15R2 is not executed, that is, when the type designation operation is absent, the progress control device 24 advances to step S103.

When the pressing operation of the L1 button 15L1 or the R2 button 15R2 is executed, in other words, when the type designation operation is present, the progress control device 24 determines details of the type designation operation (step S102). The details of the type designation operation include, for example, determination of an object on which the pressing operation is executed, that is, the L1 button 15L1 or the R2 button 15R2. When the object on which the pressing operation is executed is the R2 button 15R2, the details of the type designation operation further include an operation amount of the pressing operation. In other words, in step S102, the progress control device 24 determines the details, such as the object on which the pressing operation is executed, or the operation amount of the pressing operation of the R2 button 15R2.

After the details are determined in step S102, or absence of the type designation operation is determined in step S101, the progress control device 24 determines the type of shot (step S103). Specifically, when absence of the type designation operation is determined in step S101, the progress control device 24 determines that the type of shot is the normal shot NS. When the type designation operation applies to the pressing operation of the L1 button 15L1, the progress control device 24 determines that the type of shot is the lob shot LP. When the type designation operation applies to the pressing operation of the R2 button 15R2, the progress control device 24 determines the type of shot, based on the operation amount of the pressing operation. For example, when the operation amount of the pressing operation of the R2 button 15R2 falls in the first range OV1, the progress control device 24 determines absence of the type designation operation and determines that the type of shot is the normal shot NS after all. When the operation amount of the pressing operation of the R2 button 15R2 falls in the second range OV2, the progress control device 24 determines that the type of shot is the control shot CO. When the operation amount of the pressing operation of the R2 button 15R2 falls in the third range OV3, the progress control device 24 determines that the type of shot is the power shot PS.

Subsequently, the progress control device 24 decides the speed and the climb angle of the ball BI for each shot, based on the duration of the speed decision operation (step S104).

The decision is made according to the increase rules related to speed and climb angle that are set for each type of shot. For example, in the case of the normal shot NS, the progress control device 24 first determines the duration of the pressing operation of the left operation button 13, and decides on a speed and an angle corresponding to the duration, according to the increase rules for the normal shot NS represented by the upper graphs at (1) and (2) in the example in FIG. 7. In the case of the power shot PS, as an example, the increase rules at (1) in the example in FIG. 7 are applied, although the rules for the power shot PS at either of (1) and (2) may be applied, and, for example, a combination of the increase rules for the power shot PS represented by the lower graphs at both (1) and (2) may also be applied. Accordingly, the progress control device 24 decides on a speed and an angle corresponding to the duration, according to the increase rules of speed and angle for the power shot PS shown at (1) in the example in FIG. 7. The same applies in the cases of the lob shot LP and the control shot CO. Specifically, the progress control device 24 decides on a speed and an angle corresponding to the duration, according to the predetermined increase rules applied to the lob shot LP, or the predetermined increase rules applied to the control shot CO (for example, the rules in the example in FIG. 5 that are different from both of the rules for the normal shot NS and the rules for the power shot PS). After the speed and the angle of the ball BI are decided, the progress control device 24 terminates the current shot decision processing.

Through the procedure in FIG. 10, the speed and the angle of the ball BI for any of the four types of shots are decided, based on the user's command. Specifically, the type of shot is decided based on the type designation operation, and the speed and the height of the ball BI are decided based on the increase rules, which are applied for each type, and the duration of the speed decision operation. In other words, the speed and the height of the ball BI are decided according to the increase rules, which are applied for each type, such that each of the four types of shots is implemented according to the user's command.

The display control processing is processing for controlling display of a player PL and the ball BI, based on the user's command for a shot, so that the shot is implemented. Each time the speed and the angle of the ball BI are decided in the processing in FIG. 10 (each time the processing in FIG. 10 is terminated), the display control device 25 starts the display control processing in FIG. 11 and first causes a player PL possessing the ball BI to start a series of shooting motions (S201). In other words, the display control device 25 controls motion of the player PL so that the player PL performs the series of shooting motions. The series of shooting motions may vary with the type of shot, in some cases. In such a case, the display control device 25 first identifies the type of shot, based on a result of the processing in FIG. 10, and causes shooting motions according to the type of shot to be started. For example, when the type of shot applies to the normal shot NS, the display control device 25 causes the beginning motion shown at (1) in the examples in FIG. 8 to be started, as the series of shooting motions. Alternatively, when the type of shot applies to the power shot PS, the display control device 25 causes the beginning motion shown at (2) in the examples in FIG. 8 to be started, as the series of shooting motions.

Subsequently, the display control device 25 determines whether or not the ball BI is intercepted by a defending-side player PL through a defensive motion before the series of shooting motions is finished (for example, before a kicking motion is finished) (step S202). When the ball BI is intercepted by a defending-side player PL, the display control device 25 controls motion of the player PL so that the player PL performs a predetermined failure motion (for example, a tripping motion) for staging the shot resulting in failure (step S203). After the control, the display control device 25 terminates the current display control processing.

When the ball BI is not intercepted by a defending-side player PL before the series of shooting motions is finished, the display control device 25 causes the ball BI to start moving (step S204). In other words, the display control device 25 controls display of the ball BI so that the shot (movement of the ball BI) associated with the series of shooting motions is implemented. Moreover, when the direction command operation is executed, a result of the command is reflected in movement of the ball BI. Accordingly, the display control device 25 acquires a result of the direction command operation and reflects the result in movement of the ball BI. More specifically, the display control device 25 controls display of the ball BI so that the ball BI moves with the speed and the height decided in the processing in FIG. 10 in a direction commanded by the direction command operation. Further, the movement is executed in such a manner as to start in synchronization with the kicking motion in the series of shooting motions. For example, when a difference is caused in time before the kicking motion is finished, such as between the normal shot NS and the power shot PS, the movement is executed coincidently with the end of the kicking motion (in other words, the kicking motion is performed in synchronization with the start of movement of the ball BI). Accordingly, a difference can be caused in a period after the speed and the like of the ball BI are decided and before the ball BI actually starts moving, depending on the type of shot (for example, the power shot PS is slower to start than the normal shot NS, or the like).

Subsequently, the display control device 25 controls motion of the player PL so that the player PL performs a predetermined posterior motion (step S205). For example, a motion of swinging a foot through after kicking the ball BI is performed as the posterior motion, although the posterior motion may be configured as appropriate, or may be omitted. After the control, the display control device 25 terminates the current display control processing. Thus, display of the player PL and the ball BI is controlled so that a shot is implemented in a game screen such as the full screen 50. More specifically, motion of the player PL is controlled so that the player PL performs a series of motions according to a type of shot, and display of the ball BI is controlled so that the ball BI moves with a speed and the like according to the type of shot. As a result, staging according to the shot is also implemented, such as a staging in which the shooting motions (for example, the kicking motion) for the power shot PS are slower to finish than the shooting motions for the normal shot NS, and the ball BI is also slower to start moving.

As described hereinabove, according to the present embodiment, for example, when execution of the power shot PS is commanded, the movement speed and the climb angle of the ball BI are decided depending on the duration of the pressing operation of the left operation button 13, according to the increase rules that are different from the increase rules applied to the normal shot NS, and the ball BI is displayed in such a manner as to move with the movement speed and the climb angle. In other words, through the command for the power shot PS, the power shot PS having a different relation between movement speed and climb angle from that of the normal shot NS is implemented. Thus, when both the movement speed and the climb angle of the ball BI are decided depending on the duration of the pressing operation of the left operation button 13, types of shots, such as the normal shot NS and the power shot PS, can be increased.

More specifically, the normal shot NS is executed when the R2 button 15R2 is not operated, and the power shot PS is executed when the maximum operation of pressing the R2 button 15R2 to the maximum amount is executed. In other words, even if the same left operation button 13 is pressed for the same period, the different normal shot NS and power shot PS are used, depending on presence or absence of the maximum operation of the R2 button 15R2. For the power shot PS, the increase rules are applied that make a shot lower and faster than the increase rules applied to the normal shot NS when the left operation button 13 is operated for the same period. Accordingly, two types of shots having the different increase rules can be prepared as the same type of straight shots that move straight in the horizontal direction, each in a predetermined direction (a direction designated by the user). More specifically, the power shot PS can be implemented that is lower and faster than the normal shot NS while being a straight shot of the same type that moves straight in the horizontal direction, in the predetermined direction (the direction designated by the user).

When the same value as an initial value of movement speed and the same value as an initial value of climb angle in the increase rules for the normal shot NS are applied to an initial value of movement speed and an initial value of climb angle in the increase rules for the power shot PS, respectively, the movement speed and the climb angle of the ball BI for the power shot PS can be made to match (or approximately equivalent to) those of the normal shot NS when the duration of the pressing operation of the left operation button 13 is relatively short. Since a lower and faster shot is likely to be more effective as a shot, it is thought that usefulness of the power shot PS is higher than that of the normal shot NS. Since a difference in movement speed of the ball BI or the like between the power shot PS and the normal shot NS can be mitigated by making the initial values in the increase rules match, the effect of the power shot PS can be restrained from occurring even when the duration of the pressing operation of the left operation button 13 is relatively short.

Similarly, when motions that lag behind the shooting motions for the normal shot NS are applied to the shooting motions for the power shot PS, a disadvantage of a higher probability of being intercepted can be brought about in the power shot PS. Since the effect of the power shot PS can also be restrained by such a disadvantage, an increase in dependence on the power shot PS, in other words, a decrease in frequency of use of the normal shot NS can be limited.

When similar operations of the R2 button 15R2 function as commands for two types of shots, the control shot CO and the power shot PS, depending on operation amounts, the one type of operations of pressing the R2 button 15R2 can be used differently for the commands for the two shots, and one of the commands can be used for a command for the power shot PS. Thus, separate use of the two shots can be implemented through the intuitive operation depending only on the operation amounts thereof.

In the above-described embodiment, the progress control device 24 of the game device 2 functions as a speed decision device in the present invention by executing step S104 of the procedure in FIG. 10. The display control device 25 of the game device 2 functions as a display control device and a character control device in the present invention by executing the procedure in FIG. 11. Specifically, the display control device 25 functions as the display control device and the character control device by executing step S204 and step S201 of the procedure in FIG. 11, respectively.

The present invention is not limited to the above-described embodiment, and may be implemented as embodiments in which appropriate modifications or changes are made. For example, in the above-described embodiment, the first range OV1 of the R2 button 15R2 is configured to correspond to no operation. However, the present invention is not limited to such an embodiment. For example, an operation amount applying to a proactive operation may be set as the first range OV1 of the R2 button 15R2, and the normal shot NS may be commanded by an operation of proactively pressing the R2 button 15R2 by the operation amount falling in the first range OV1. In other words, the single R2 button 15R2 may function as type designation operations for three types of shots, depending on the operation amounts. In such a case, the operation of proactively pressing the R2 button 15R2 by the operation amount falling in the first range OV1 functions as a first operation in the present invention.

In the above-described embodiment, motions that lag (hereinafter, also referred to as lagging motions in some cases) behind the shooting motions for the normal shot NS are adopted as the shooting motions for the power shot PS. However, the present invention is not limited to such an embodiment. For example, an exception may be provided to the lagging motions as appropriate. Specifically, for example, when the power shot PS is commanded while a player PL is moving toward the ball BI at high speed, the lagging motions may be avoided because of the necessity for ball speed to become high. In other words, in such a case, the power shot PS may be implemented by similar motions to those of the normal shot NS, or motions that are different from those of the normal shot NS but finish as far as the kicking motion in approximately the same length of time. Alternatively, the lagging motions may be applied limitedly to a specific situation. For example, when the power shot PS is commanded when a player PL faces in an opposite direction to the goal GO (toward the own goal GO), an adjusting motion of facing the goal GO (on the opposition side) to shoot may be automatically applied, and the lagging motions may be performed only when such an adjusting motion is applied. In other words, the lagging motions are applied only when the power shot PS is commanded in a situation that is not suitable for the various shots, and shooting motions that take approximately the same length of time as the normal shot NS may be applied also to the power shot PS on other occasions. In such cases, a command for the power shot PS can be made strategic, in terms of choosing to enjoy the lagging motions or to perform a motion for avoiding the lagging motions.

Figure 11:
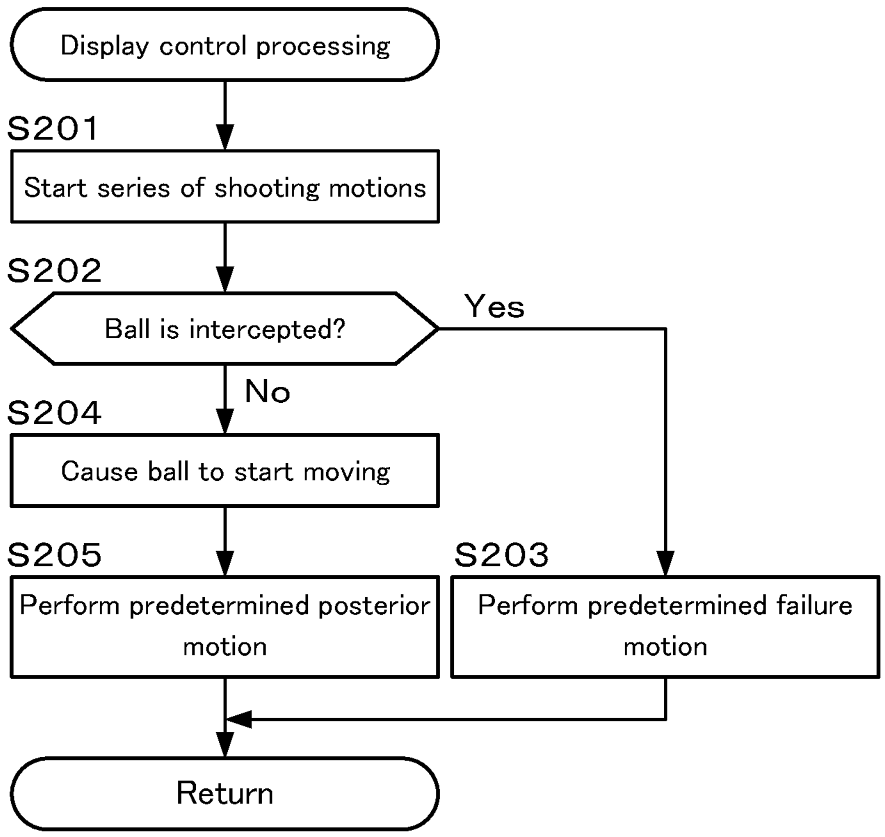
FIG. 11 is a flowchart showing an example of a procedure for display control processing.

In the above-described embodiment, the game device 2 executes the processing in FIGS. 10 to 11. As a result, the game device 2 alone (or the control unit 21 of the game device 2 alone) functions as a game system in the present invention. However, the present invention is not limited to such an embodiment. For example, all, or one or some, of the roles of the game device 2 (for example, the processing and the like in FIGS. 10 to 11) may be executed by the server 3. Accordingly, for example, when the server 3 executes all of the processing in FIGS. 10 to 11, the server 3 alone (including a case of being implemented by a combination of a plurality of server devices) may function as the game system in the present invention. Alternatively, in the other way around, the game device 2 may execute all, or one or some, of the roles of the server 3. In such a case, the server 3 may be omitted.

Various aspects of the present invention derived from each of the above-described embodiment and modifications are described below. Incidentally, in the following description, although corresponding members depicted in the accompanying drawings are added in parentheses in order to facilitate the understanding of each aspect of the present invention, such addition is not intended to limit the present invention to the depicted forms.

The non-transitory computer readable storage medium of the present invention is a non-transitory computer readable storage medium storing a computer program for a computer (21) incorporated in a game system (2) connected to an input device (6) and a display device (7), the input device receiving a plurality of types of commands inputted by a user, the display device displaying a game screen (50) including a character (PL) caused to move through the plurality of types of commands and a ball (BI) maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot (NS) following a predetermined first rule by which the movement speed and the climb angle of the ball increase depending on duration of the speed command, wherein the computer program causes the computer to function as: a speed decision device (24) configured to, when a specific command associated with a second shot (PS) as a shot moving in the predetermined direction similarly to the first shot is given as part of the shoot command, decide the movement speed and the climb angle of the ball for the second shot so that the movement speed and the climb angle of the ball increase depending on the duration of the speed command, according to a second rule as a different rule from the first rule; and a display control device (25) configured to control display of the ball so that the ball moves as the second shot with the movement speed and the climb angle decided according to the second rule.

According to the present invention, when the specific command is given, the movement speed and the climb angle of the ball are decided depending on the duration of the speed command, according to the second rule that is different from the first rule, and the ball is displayed in such a manner as to move with the movement speed and the climb angle. In other words, the second shot having a different relation between movement speed and climb angle from that of the first shot is implemented through the specific command. Thus, in the soccer game in which both the movement speed and the climb angle of the ball are decided depending on the duration of the speed command, types of shots such as the first shot and the second shot can be increased.

For the second shot, any of various shots moving in the predetermined direction similarly to the first shot may be adopted. Moreover, the predetermined direction may be set as appropriate. For example, the predetermined direction may be a preset fixed direction, or may be a direction that is set according to the user's command. For example, in an aspect of the computer program according to the present invention, the shoot command may include, as a command inputted via the input device, a direction command (14L) that is given in such a manner as to command a movement direction of the ball, and each of the first shot and the second shot may be configured as the same type of shot that moves straight in the movement direction, as the predetermined direction, designated by the user through the direction command. In such a case, a plurality of shots having different relations between the movement speed and the climb angle of the ball depending on the duration of the speed command can be prepared as the same type of shots that move straight, each in the movement direction designated by the user.

The plurality of types of commands including the specific command may be implemented as appropriate. For example, the specific command may be a specific motion performed by the user. In such a case, a detection device detecting the motion of the user may function as the input device. Alternatively, each command may be inputted via an appropriate operation part. In such a case, an operation part with which each of the commands is given may be provided to the input device as appropriate. For example, in an aspect of the computer program according to the present invention, the input device may include a shooting operation part (15R2) with which the specific command is given, operation of the shooting operation part may include a first operation and a second operation that are set depending on operation amounts of the operation, and the specific command may be assigned to the second operation. In such a case, the single shooting operation part can be used differently for the two operations, depending on the operation amounts, and one of the operations can be used for the specific command.

An appropriate role may be assigned to the first operation. For example, a role other than shooting, such as dribbling, may be assigned to the first operation. Alternatively, a command for a shot other than the second shot may be assigned to the first operation. For example, in the aspect where the input device includes the shooting operation part, when a third shot (CO) other than the first shot and the second shot is prepared, a command for any one of the third shot and the first shot may be assigned to the first operation, the speed decision device may be configured to decide the movement speed and the climb angle of the ball according to the second rule when an operation with an operation amount falling in the second operation is executed on the shooting operation part, and to decide the movement speed and the climb angle of the ball for the first shot or the third shot when the first operation is executed, based on the command for the first shot assigned to the first operation so that the movement speed and the climb angle of the ball increase according to the first rule, or based on the command for the third shot assigned to the first operation so that the movement speed and the climb angle of the ball increase according to a third rule as a different rule from any of the first rule and the second rule, depending on the duration of the speed command, and when the first operation is executed, the display control device may be configured to control display of the ball so that the ball moves with the movement speed and the climb angle decided according to the first rule, as the first shot, or decided according to the third rule, as the third shot. In such a case, the single shooting operation part can be used differently for the commands for the two types of shots, depending on the operation amounts.

The first shot may be commanded as appropriate. For example, when only the speed command is given, the command may be determined to be the command for the first shot. In other words, the first shot may be commanded through only the speed command, without a command for a type of shot, such as the specific command. Alternatively, similarly to the second shot, a proactive command that commands the first shot may be provided also for the first shot. In such a case, such a command may be implemented as appropriate and, for example, may be implemented through the first operation as described above. The same applies to the command for the third shot. For example, in the aspect where the input device includes the shooting operation part, operation of the shooting operation part may further include a third operation that is set depending on an operation amount of the operation, the command for the first shot and the command for the third shot may be assigned to the first operation and the third operation, respectively, and the speed decision device may be configured to decide the movement speed and the climb angle of the ball for the first shot and for the third shot so that the movement speed and the climb angle of the ball increase according to the first rule when the first operation is executed, and according to the third rule when the third operation is executed, respectively. In such a case, the single shooting operation part can be used differently for the commands for the three types of shots, depending on the operation amounts.

Any of various rules may be set as the first rule and the second rule as appropriate. For example, any of various rules, such as a rule by which speed increases as in a linear function (linearly) with the duration of the speed command, a rule by which speed increases quadratically, a rule by which speed increases exponentially, or a rule by which speed increases stepwise, may be applied as a rule related to increases in speed. Moreover, in such increase rules, an initial value may be set as appropriate. For example, zero may be set as the initial value, and unless the speed command is continued for a certain period or more, materialization of a shot may fail (movement does not occur because the movement speed is zero). Alternatively, an appropriate value other than zero may be set as the initial value. The same applies to the angle. An appropriate combination of any of the speed-related rules and the angle-related rules may be applied to the first rule or the second rule. Moreover, the initial value of movement speed and the initial value of climb angle in the second rule may match, or may differ as appropriate from, the initial value of movement speed and the initial value of climb angle in the first rule. For example, in an aspect of the computer program according to the present invention, each of the first rule and the second rule may be set so that both the movement speed and the climb angle of the ball linearly increase with the duration of the speed command, and the same initial value of movement speed of the ball and the same initial value of climb angle of the ball may be set in the first rule and the second rule. In such a case, at the speed command lasting for a relatively short period, differences in movement speed and the like between the first shot and the second shot can be mitigated.

As the second rule, an appropriate rule that is different from the first rule may be applied. For example, for the second rule, a rule using larger rates, or a rule using smaller rates, of increase in movement speed and climb angle with the duration of the speed command than those used in the first rule may be adopted. Such differences may be created as appropriate based on a characteristic of each rule, and may be created in part of the duration, or over the entire duration, of the speed command. For example, in the aspect where the linear rule is applied to both the first rule and the second rule in the present invention, for the second rule, any one combination of common-angle rules and common-speed rules may be used, the common-angle rules using the climb angle of the ball to which a linear line increasing similarly to the climb angle of the ball in the first rule is applied and the movement speed of the ball to which a linear line increasing at a larger increase rate than the movement speed of the ball in the first rule is applied, the common-speed rules using the movement speed of the ball to which a linear line increasing similarly to the movement speed of the ball in the first rule is applied and the climb angle of the ball to which a linear line increasing at a smaller increase rate than the climb angle of the ball in the first rule is applied. In such a case, a shot that is lower and faster than the first shot, while being a shot of the same type as the first shot, can be implemented as the second shot.

The first shot and the second shot may be rendered as appropriate in the game screen. For example, in an aspect of the computer program according to the present invention, the display control device may be configured to control display of the ball so that a period after the movement speed and the climb angle of the ball are decided and before the ball starts moving is longer for the second shot than for the first shot. Moreover, in such an aspect, an aspect further causing the computer to function as a character control device (25) configured to control the motion of the character so that, when the second shot is to be executed, the character performs, as a series of motions up to a motion of kicking the ball, motions in which a timing of the motion of kicking the ball lags behind the timing in the series of motions for the first shot, by causing the motion of kicking the ball to be executed in synchronization with start of movement of the ball.

The game system according to the present invention is a game system (2) comprising a computer (31) connected to an input device (6) and a display device (7), the input device receiving a plurality of types of commands inputted by a user, the display device displaying a game screen (50) including a character (PL) caused to move through the plurality of types of commands and a ball (BI) maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot (NS) following a predetermined first rule by which the movement speed and the climb angle of the ball increase depending on duration of the speed command, wherein the computer serves as: a speed decision device (24) configured to, when a specific command associated with a second shot (PS) as a shot moving in the predetermined direction similarly to the first shot is given as part of the shoot command, decide the movement speed and the climb angle of the ball for the second shot so that the movement speed and the climb angle of the ball increase depending on the duration of the speed command, according to a second rule as a different rule from the first rule; and a display control device (25) configured to control display of the ball so that the ball moves as the second shot with the movement speed and the climb angle decided according to the second rule.

The control method according to the present invention is a control method executed by a computer (21) incorporated in a game system (2) connected to an input device (6) and a display device (7), the input device receiving a plurality of types of commands inputted by a user, the display device displaying a game screen (50) including a character (PL) caused to move through the plurality of types of commands and a ball (BI) maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot (NS) following a predetermined first rule by which the movement speed and the climb angle of the ball increase depending on duration of the speed command, wherein the control method comprises: a speed decision procedure of, when a specific command associated with a second shot (PS) as a shot moving in the predetermined direction similarly to the first shot is given as part of the shoot command, deciding the movement speed and the climb angle of the ball for the second shot so that the movement speed and the climb angle of the ball increase depending on the duration of the speed command, according to a second rule as a different rule from the first rule; and a display control procedure of controlling display of the ball so that the ball moves as the second shot with the movement speed and the climb angle decided according to the second rule. The game system of the present invention can be implemented by executing the computer program or the control method of the present invention.

The invention claimed is:

1. A non-transitory computer readable storage medium storing a computer program for a computer incorporated in a game system connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command, wherein the computer program causes the computer to function as:

a speed decision device configured to, when a specific command associated with a second shot as a shot moving in the predetermined direction similarly to the first shot is given as part of the shoot command, decide the movement speed and the climb angle of the ball for the second shot so that the movement speed and the climb angle of the ball increase depending on the duration of the speed command, according to a second rule as a different rule from the first rule; and a display control device configured to control display of the ball so that the ball moves as the second shot with the movement speed and the climb angle decided according to the second rule.

2. The non-transitory computer readable storage medium storing the computer program according to claim 1, wherein the shoot command includes, as a command inputted via the input device, a direction command that is given in such a manner as to command a movement direction of the ball, and each of the first shot and the second shot are configured as the same type of shot that moves straight in the movement direction, as the predetermined direction, designated by the user through the direction command.

3. The non-transitory computer readable storage medium storing the computer program according to claim 1, wherein the input device includes a shooting operation part with which the specific command is given, operation of the shooting operation part includes a first operation and a second operation that are set depending on operation amounts of the operation, and the specific command is assigned to the second operation.

4. The non-transitory computer readable storage medium storing the computer program according to claim 3, wherein when a third shot other than the first shot and the second shot is prepared, a command for any one of the third shot and the first shot be assigned to the first operation, the speed decision device is configured to decide the movement speed and the climb angle of the ball according to the second rule when an operation with an operation amount falling in the second operation is executed on the shooting operation part, and to decide the movement speed and the climb angle of the ball for the first shot or the third shot when the first operation is executed, based on the command for the first shot assigned to the first operation so that the movement speed and the climb angle of the ball increase according to the first rule, or based on the command for the third shot assigned to the first operation so that the movement speed and the climb angle of the ball increase according to a third rule as a different rule from any of the first rule and the second rule, depending on the duration of the speed command, and when the first operation is executed, the display control device is configured to control display of the ball so that the ball moves with the movement speed and the climb angle decided according to the first rule, as the first shot, or decided according to the third rule, as the third shot.

5. The non-transitory computer readable storage medium storing the computer program according to claim 4, wherein operation of the shooting operation part further includes a third operation that is set depending on an operation amount of the operation, the command for the first shot and the command for the third shot are assigned to the first operation and the third operation, respectively, and the speed decision device is configured to decide the movement speed and the climb angle of the ball for the first shot and for the third shot so that the movement speed and the climb angle of the ball increase according to the first rule when the first operation is executed, and according to the third rule when the third operation is executed, respectively.

6. The non-transitory computer readable storage medium storing the computer program according to claim 1, wherein each of the first rule and the second rule are set so that both the movement speed and the climb angle of the ball linearly increase with the duration of the speed command, and the same initial value of movement speed of the ball and the same initial value of climb angle of the ball are set in the first rule and the second rule.

7. The non-transitory computer readable storage medium storing the computer program according to claim 6, wherein for the second rule, any one combination of common-angle rules and common-speed rules are used, the common-angle rules using the climb angle of the ball to which a linear line increasing similarly to the climb angle of the ball in the first rule is applied and the movement speed of the ball to which a linear line increasing at a larger increase rate than the movement speed of the ball in the first rule is applied, the common-speed rules using the movement speed of the ball to which a linear line increasing similarly to the movement speed of the ball in the first rule is applied and the climb angle of the ball to which a linear line increasing at a smaller increase rate than the climb angle of the ball in the first rule is applied.

8. The non-transitory computer readable storage medium storing the computer program according to claim 1, wherein the display control device is configured to control display of the ball so that a period after the movement speed and the climb angle of the ball are decided and before the ball starts moving is longer for the second shot than for the first shot.

9. The non-transitory computer readable storage medium storing the computer program according to claim 8, wherein the computer program further causes the computer to function as a character control device configured to control the motion of the character so that, when the second shot is to be executed, the character performs, as a series of motions up to a motion of kicking the ball, motions in which a timing of the motion of kicking the ball lags behind the timing in the series of motions for the first shot, by causing the motion of kicking the ball to be executed in synchronization with start of movement of the ball.

10. A game system comprising a computer connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command, wherein the computer serves as:

a speed decision device configured to, when a specific command associated with a second shot as a shot moving in the predetermined direction similarly to the first shot is given as part of the shoot command, decide the movement speed and the climb angle of the ball for the second shot so that the movement speed and the climb angle of the ball increase depending on the duration of the speed command, according to a second rule as a different rule from the first rule; and a display control device configured to control display of the ball so that the ball moves as the second shot with the movement speed and the climb angle decided according to the second rule.

11. A control method executed by a computer incorporated in a game system connected to an input device and a display device, the input device receiving a plurality of types of commands inputted by a user, the display device displaying a game screen including a character caused to move through the plurality of types of commands and a ball maneuvered through motion of the character, the game system providing a soccer game in which when a shoot command, including a speed command as a command for a movement speed and a climb angle of the ball, is given by the user, the character moves in such a manner as to execute, as a shot moving in a predetermined direction, a first shot following a predetermined first rule by which the movement speed and the climb angle of the ball increase depending on duration of the speed command, wherein the control method comprises:

a speed decision procedure of, when a specific command associated with a second shot (PS) as a shot moving in the predetermined direction similarly to the first shot is given as part of the shoot command, deciding the movement speed and the climb angle of the ball for the second shot so that the movement speed and the climb angle of the ball increase depending on the duration of the speed command, according to a second rule as a different rule from the first rule; and a display control procedure of controlling display of the ball so that the ball moves as the second shot with the movement speed and the climb angle decided according to the second rule; the game system of the present invention can be implemented by executing the computer program or the control method of the present invention.

* * * * *